Patented Oct. 14, 1947

2,429,081

UNITED STATES PATENT OFFICE 2,429,081

METHOD OF TREATING TRIPHENYL ROSANILINE SPIRIT BLUE

Henry N. Steuber, Montclair, N. J., assignor to American Dyewood Company, New York, N. Y., a corporation of Pennsylvania No Drawing. Application October 3, 1946, Serial No. 701,062

12 Claims. (Cl. 260—391)

This invention relates to a method of treating rosaniline spirit blue in order to produce improved dyestuffs suitable for use in various commercial applications.

The available methods of producing phenylated compounds of rosaniline base, the hydrochloride derivatives known as "spirit blue" and the sulfonated compounds thereof generally designated "alkali blue," "acid blue" and "water blue," result generally in the formation of a substantial proportion of triphenyl compounds. These have the undesirable characteristic of a greenish shade which is less satisfactory than the reddish shade of mono and diphenyl compounds. Hence the triphenyl compounds are in less demand for commercial purposes for which these dyestuffs are utilized.

It is the object of the present invention to provide a simple, effective and economically practicable method of modifying rosaniline blue to eliminate phenyl groups therefrom and to produce dyestuffs which are more suitable and commercially acceptable for their usual applications.

Other objects and advantages of the invention will be better understood by reference to the following specification, in which the preferred procedure is described.

In carrying out the method, triphenyl rosaniline spirit blue, the hydrochloride of the carbinol base, which may contain also both mono and diphenyl compounds in relatively minor proportions, is prepared by any suitable procedure. The preparation of the triphenyl compound forms no part of the present invention, and no description of the procedure is necessary, since it is well known in the art.

The novel method consists in dissolving triphenyl rosaniline spirit blue in a suitable solvent such as aniline, adding ammonia, either as aqua ammonia or as a gas, and heating the mixture to an elevated temperature, preferably between 150° and 190° C. in an autoclave under relatively high pressures, for example between 10 and 20 atmospheres gauge. While aniline is the preferred solvent, other similar compounds may be used. The heating is continued for several hours, the time depending upon the temperature and pressure and the desired results in respect to the removal of phenyl groups. When the reaction is completed, the mixture is cooled, and sufficient hydrochloric acid is added to neutralize the aniline and ammonia and to convert the resulting rosaniline blue base to the hydrochloride or spirit blue. The latter is removed by filtration, followed by washing. The filtrate is then neutralized with lime or other suitable alkali to liberate aniline, which may be distilled and reused in subsequent operations. Surplus ammonia can be used to reconvert aniline hydrochloride in the filtrate to aniline.

Although hydrochloric acid is preferred as a neutralizing agent, other mineral acids such as sulfuric and nitric acids may be used. If the latter acids are used, the sulfate or nitrate rather than the hydrochloride will be formed.

The rosaniline product may be the monophenyl or diphenyl compound, depending upon the time and other conditions of treatment, or it may be a mixture of both. It may contain relatively small proportions of the triphenyl compound, but the shade of the spirit blue obtained by the procedure is distinctly reddish, as contrasted with the greenish shade of the triphenyl compound. Thus, by modifying the degree of phenylation, a more desirable commercial product is obtained which is suitable for use in many cases where the triphenyl compound is not acceptable.

While primarily intended for the treatment of triphenyl rosaniline blue to a lower degree of phenylation thereof, the procedure is applicable also to the removal of phenyl groups from diphenyl rosaniline compounds. Thus it is possible to prepare desirable monophenyl compounds from either the triphenyl or diphenyl compounds. The time of reaction can be varied to accomplish the particular result desired.

The spirit blue produced as herein described may be treated, if desired, with concentrated sulfuric acid to sulfonate it and to obtain thereby, depending upon the degree of sulfonation, satisfactory "alkali blue," "acid blue" and "water blue." The procedure for sulfonation is well known in the art.

As an example of the invention, 30 parts by weight of triphenyl rosaniline spirit blue and 155 parts by weight of aniline are mixed with 72 parts by weight of 26° Bé. aqua ammonia, and, when fully in solution, the mixture is heated in an autoclave, preferably with continuous stirring. During the first hour, the temperature is raised to 167° C. and the pressure rises to 180 pounds per square inch gauge. The temperature is held at 165° to 170° C. for one and three-quarters hours, during which the pressure rises to 190 pounds per square inch gauge. Heating is then discontinued, and the mixture is permitted to cool. Hydrochloric acid is added in sufficient amount to neutralize the aniline and ammonia and to produce the hydrochloride of the carbinol base of rosaniline blue. The latter is filtered from the solution and washed. The product has the desirable reddish shade and consists essentially of the diphenyl compound.

The filtrate, after neutralizing with lime or other alkali, is distilled to recover the aniline which may be used in subsequent batches. Hence there is no substantial loss of the aniline used.

The method as described permits conversion of the less desirable triphenyl compounds into diphenyl and monophenyl compounds at relatively slight expense and with the advantage that the products are more useful and bring a better price because of better shade. The operation is simple and economical and well adapted for commercial production of the desired products.

Various changes may be made in the procedure as described without departing from the invention or sacrificing the advantages thereof.

I claim:

1. The method of converting triphenyl rosaniline spirit blue to a lower degree of phenylation and an improved shade which comprises heating a mixture of triphenyl rosaniline spirit blue, aniline and ammonia at an elevated pressure, cooling the mixture, adding sufficient hydrochloric acid to the mixture to neutralize the aniline and ammonia and to convert the rosaniline blue base to the hydrochloride, and filtering to recover the product.

2. The method of converting triphenyl rosaniline spirit blue to a lower degree of phenylation and an improved shade which comprises heating a mixture of triphenyl rosaniline spirit blue, aniline and ammonia to a temperature of 150° to 190° C. at an elevated pressure, cooling the mixture, adding sufficient hydrochloric acid to the mixture to neutralize the aniline and ammonia and to convert the rosaniline blue base to the hydrochloride, and filtering to recover the product.

3. The method of converting triphenyl rosaniline spirit blue to a lower degree of phenylation and an improved shade which comprises heating a mixture of triphenyl rosaniline spirit blue, aniline and ammonia at an elevated pressure of 10 to 20 atmospheres, cooling the mixture, adding sufficient hydrochloric acid to the mixture to neutralize the aniline and ammonia and to convert the rosaniline blue base to the hydrochloride, and filtering to recover the product.

4. The method of converting triphenyl rosaniline spirit blue to a lower degree of phenylation and an improved shade which comprises heating a mixture of triphenyl rosaniline spirit blue, aniline and ammonia to a temperature of 150° to 190° C. at an elevated pressure of 10 to 20 atmospheres, cooling the mixture, adding sufficient hydrochloric acid to the mixture to neutralize the aniline and ammonia and to convert the rosaniline blue base to the hydrochloride, and filtering to recover the product.

5. The method of converting polyphenylated rosaniline spirit blue to a lower degree of phenylation and an improved shade which comprises heating a mixture of polyphenylated rosaniline spirit blue, aniline and ammonia at an elevated pressure, adding a mineral acid to neutralize the aniline and ammonia and to convert the rosaniline blue base to a salt of the mineral acid, and filtering to recover the product.

6. The method of converting polyphenylated rosaniline spirit blue to a lower degree of phenylation and an improved shade which comprises heating a mixture of polyphenylated rosaniline spirit blue, aniline and ammonia to a temperature of 150° to 190° C. at an elevated pressure, adding a mineral acid to neutralize the aniline and ammonia and to convert the rosaniline blue base to a salt of the mineral acid, and filtering to recover the product.

7. The method of converting polyphenylated rosaniline spirit blue to a lower degree of phenylation and an improved shade which comprises heating a mixture of polyphenylated rosaniline spirit blue, aniline and ammonia, at an elevated pressure of 10 to 20 atmospheres, adding a mineral acid to neutralize the aniline and ammonia and to convert the rosaniline blue base to a salt of the mineral acid and filtering to recover the product.

8. The method of converting polyphenylated rosaniline spirit blue to a lower degree of phenylation and an improved shade which comprises heating a mixture of polyphenylated rosaniline spirit blue, aniline and ammonia to a temperature of 150° to 190° C., at an elevated pressure of 10 to 20 atmospheres, adding a mineral acid to neutralize the aniline and ammonia and to convert the rosaniline blue base to a salt of the mineral acid and filtering to recover the product.

9. The method of converting polyphenylated rosaniline spirit blue to a lower degree of phenylation and an improved shade which comprises heating a mixture of polyphenylated rosaniline spirit blue, aniline and ammonia at an elevated pressure, adding a mineral acid to neutralize the aniline and ammonia and to convert the rosaniline blue base to a salt of the mineral acid, filtering to recover the product and adding a stronger base to the filtrate to liberate the aniline.

10. The method of converting polyphenylated rosaniline spirit blue to a lower degree of phenylation and an improved shade which comprises heating a mixture of polyphenylated rosaniline spirit blue, aniline and ammonia at an elevated pressure, adding hydrochloric acid to neutralize the aniline and ammonia and to convert the rosaniline blue base to the hydrochloride, and filtering to recover the product.

11. The method of converting polyphenylated rosaniline spirit blue to a lower degree of phenylation and an improved shade which comprises heating a mixture of polyphenylated rosaniline spirit blue, aniline and ammonia to a temperature of 150° to 190° C. at an elevated pressure, adding hydrochloric acid to neutralize the aniline and ammonia and to convert the rosaniline blue base to the hydrochloride, and filtering to recover the product.

12. The method of converting triphenyl rosaniline spirit blue to a lower degree of phenylation and an improved shade which comprises heating a mixture of triphenyl rosaniline spirit blue, aniline and ammonia at an elevated pressure, cooling the mixture, adding sufficient hydrochloric acid to the mixture to neutralize the aniline and ammonia and to convert the rosaniline blue base to the hydrochloride, filtering to recover the product and adding a stronger base to the filtrate to liberate the aniline.

HENRY N. STEUBER.